June 18, 1974  C. DUNN III, ET AL  3,817,800
METHOD OF THERMALLY COMPENSATING OPTICAL MIRRORS
Filed July 3, 1972                                    2 Sheets-Sheet 1

United States Patent Office 3,817,800
Patented June 18, 1974

3,817,800
METHOD OF THERMALLY COMPENSATING OPTICAL MIRRORS
Charlton Dunn III, Chatsworth, Ronald D. Tobin, Newbury Park, and Neil E. Bergstreser, Canoga Park, Calif., assignors to North American Rockwell Corporation
Filed July 3, 1972, Ser. No. 268,288
Int. Cl. G02b 5/08
U.S. Cl. 156—64     4 Claims

ABSTRACT OF THE DISCLOSURE

A method of thermally compensating a mirror comprising the steps of forming a laminated mirror structure having a reflective front surface, a rear surface defining a coolant outlet, a plurality of intermediate plates defining coolant distribution passageways for circulating coolant fluid in heat exchanging relation with said reflective surface and establishing a minimum temperature plane within said structure extending parallel to said surfaces, and coolant inlet means for deliverying coolant fluid to said distribution passageways; determining the thermal distribution through said structure to determine the location of the neutral plane of said structure; and adjusting said structure to balance the thermal moments about said neutral plane.

BACKGROUND OF THE INVENTION

Field of the invention

This invention relates to optical mirrors and is particularly directed to a method of compensating optical mirrors to prevent thermal distortion.

Prior art

Optical mirrors, particularly when used in conjunction with lasers are frequently subjected to extreme thermal loads. In some instances, the thermal loads have been sufficient to melt or otherwise damage or destroy the reflective surface of the mirror. To overcome these problems, it has been proposed to construct optical mirrors in a manner such as to permit circulation of coolant fluids in heat exchanging relation with the reflective surface. Unfortunately, with the mirror designs of the prior art, the introduction of such coolant fluids and the power absorbed at the reflective surface have produced thermal stresses which have caused distortion of the mirrors. This distortion requires readjustment of the mirror and, in many cases, renders the mirror useless for the intended purpose. Numerous techniques have been proposed heretofore to overcome this problem. However, none of the prior art techniques have been entirely satisfactory. Most of the prior art effort has been directed toward designing the arrangement of the coolant distribution passages to minimize such thermal stress and to attempting to select materials to minimize distortion which usually results in the use of exotic metals and alloys which are expensive and which are extremely difficult to fabricate, and the mirrors often do not recover to the original mirror surface figure upon cycling. Moreover, even when great care is taken in the choice of materials and arrangement of coolant passages, it has been found that thermal distortion frequently is larger than can be tolerated. Moreover, no techniques have been proposed heretofore for adjusting the mirrors to compensate for such thermal stress. Hence, when undue distortion has occurred with the prior art mirrors, the mirrors have simply been limited to very short periods of operation, or discarded.

BRIEF SUMMARY AND OBJECTS OF INVENTION

These disadvantages of the prior art are overcome with the present invention and a method is proposed which permits adjustment of optical mirrors to compensate for thermal stresses and which may be employed to design optical mirrors which will have minimal thermal distortion.

The advantages of the present invention are preferably attained by forming a laminated mirror structure having a reflective front surface, a rear surface defining a coolant outlet, a plurality of intermediate plates defining coolant distribution passageways for circulating coolant fluid in heat exchanging relation with said reflective surface and establishing a minimum temperature plane within said structure extending parallel to said surfaces, and coolant inlet means for delivering coolant fluid to said distribution passageways; determining the thermal distribution through said structure to determine the location of the neutral plane of said structure; and adjusting said structure to balance the thermal moments about said neutral plane, which is approximately halfway through the thickness.

Accordingly, it is an object of the present invention to provide a method of thermally compensating mirrors.

Another object of the present invention is to provide an improved method of designing optical mirrors.

An additional object of the present invention is to provide a method of adjusting the thermal distribution through a mirror.

A further object of the present invention is to provide a method of minimizing thermal distortion of mirrors.

A specific object of the present invention is to provide a method of forming a thermally compensated mirror, said method comprising the steps of constructing a laminated mirror structure having a front plate formed with a reflective front surface, a rear surface plate defining a coolant outlet, a plurality of intermediate plates defining coolant distribution passageways for circulating coolant fluid in heat exchanging relation with said reflective surface and establishing a minimum temperature plane within said structure extending parallel to said surfaces, and coolant inlet means for delivering coolant fluid to said distribution passageways; determining the thermal distribution through said structure to determine the neutral plane of said structure; and adjusting said structure to balance the thermal moments about said neutral plane.

Another specific object of the present invention is to provide a method of minimizing thermal distortion of a mirror, said method comprising the steps of determining the thermal distribution through said mirror, establishing a minimum temperature plane extending parallel to the reflective surface of said mirror, and adjusting the structure of said mirror to balance the thermal moment through the mirror about the neutral plane of the mirror.

These and other objects and features of the present invention will be apparent from the following detailed description, taken with reference to the accompanying drawing.

DETAILED DESCRIPTION OF ILLUSTRATED EMBODIMENT

Figure 1:
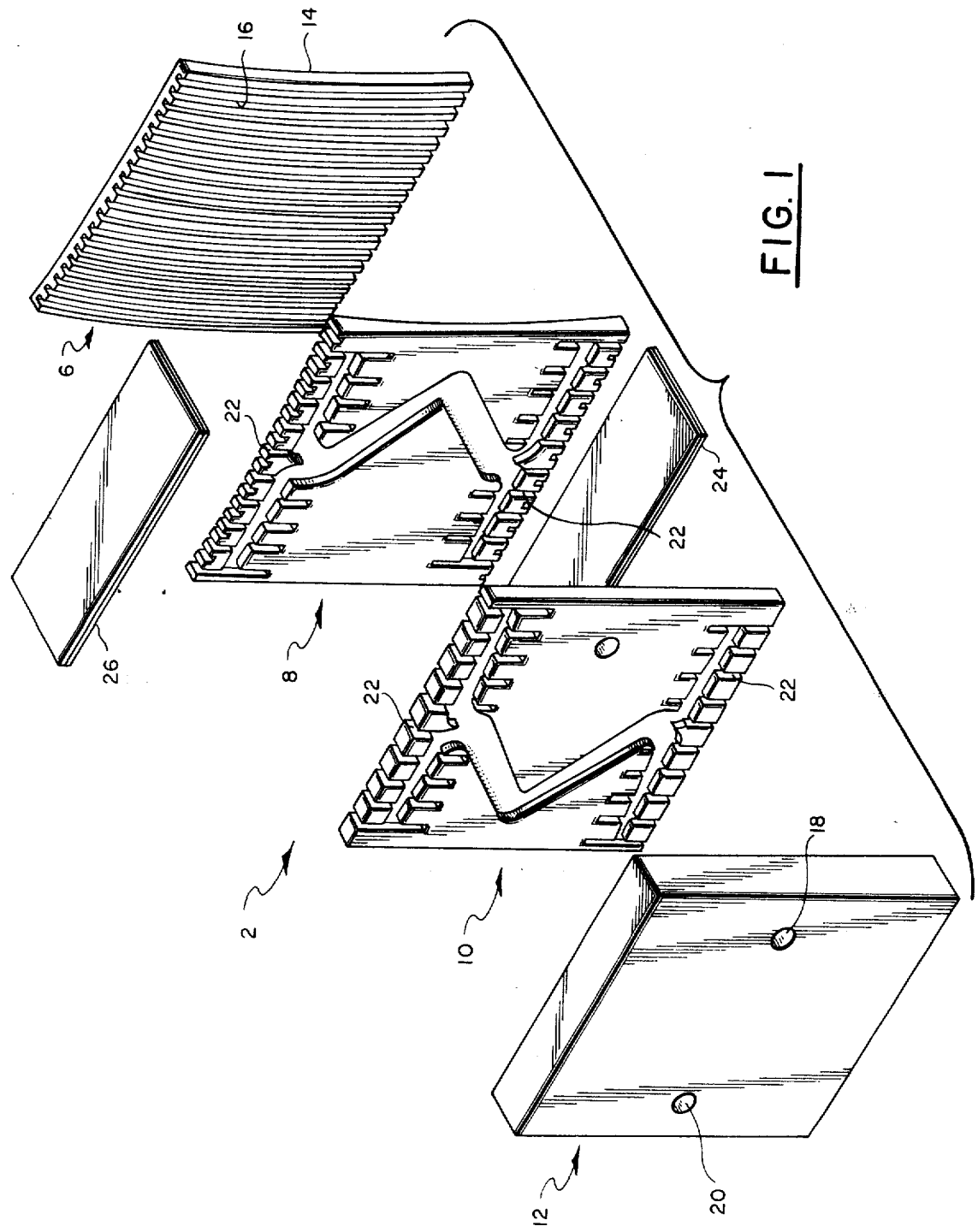
FIG. 1 is an exploded isometric view of a mirror designed in accordance with the method of the present invention.
Figure 2:
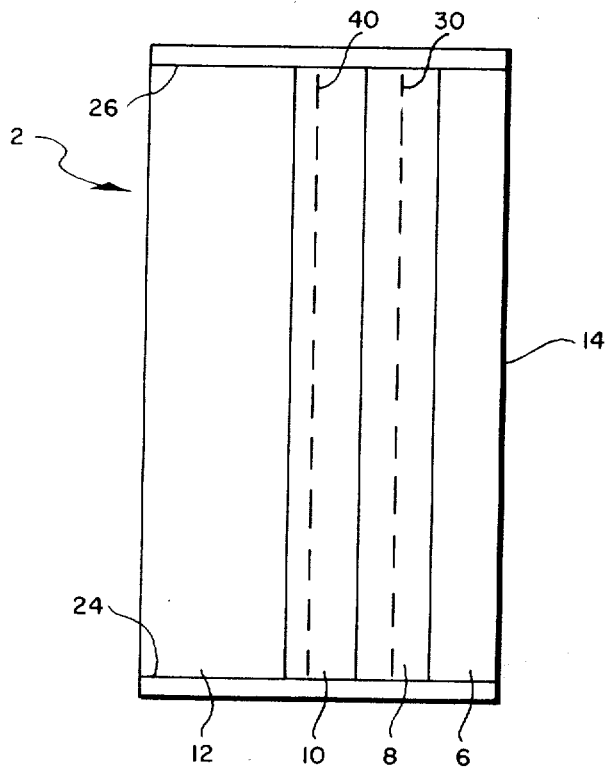
FIG. 2 is a diagrammatic representation of the mirror of FIG. 1.

In that form of the present invention chosen for purposes of illustration in the drawing, FIG. 1 shows a mirror structure, indicated generally at 2, comprising a plurality of plates 6, 8, 10 and 12 which may be bonded together, in any suitable manner, to form a laminated structure. The front plate 6 has its front surface 14 polished or suitably coated to provide a reflective surface and has a plurality of grooves 16 formed in its rear surface to conduct coolant fluid in heat exchanging relation with the reflective surface 14. The rear plate 12 is formed with a pair of apertures 18 and 20 which serve as coolant inlet and coolant outlet openings, respectively. The intermediate plates 8 and 10 are formed with coolant distribution passageways, indicated generally at 22, for receiving coolant from inlet opening 18 of rear plate 12, distributing the coolant to grooves 16 of front plate 6, collecting coolant from the opposite ends of the grooves 16 and delivering the coolant to the coolant outlet opening 20 in rear plate 12. Cover plates 24 and 26 serve to close the peripheral distribution passageways 22 and to assist in bonding the plates 6, 8, 10 and 12 to form an integral structure, as seen in FIG. 2. The details of the mirror 2 and the fluid circulation therethrough are more fully disclosed in the copending U.S. patent application, Ser. No. 130,-744, filed Apr. 2, 1971, now U.S. Pat. No. 3,708,223, by R. L. Sorenson and C. Dunn, and assigned to the assignee of the present application.

As seen in FIG. 1, coolant fluid is passed through inlet opening 18 of rear plate 12 and is passed through plate 10 to plate 8 which distributes the coolant fluid to the grooves 16 of front plate 6. The coolant fluid is then passed through grooves 16 in heat exchanging relation with the reflective surface 14 and, thereafter, is passed through plate 8 to plate 10, where the coolant fluid is collected and delivered through outlet opening 20 in the rear plate 12. The coolant fluid is cold when it is delivered through inlet 18 to distribution plate 8, absorbs heat as it flows through the grooves 16 of front plate 6 and is hot when it is received by collection plate 10 and delivered to the outlet opening 20 of rear plate 12.

Figure 3:
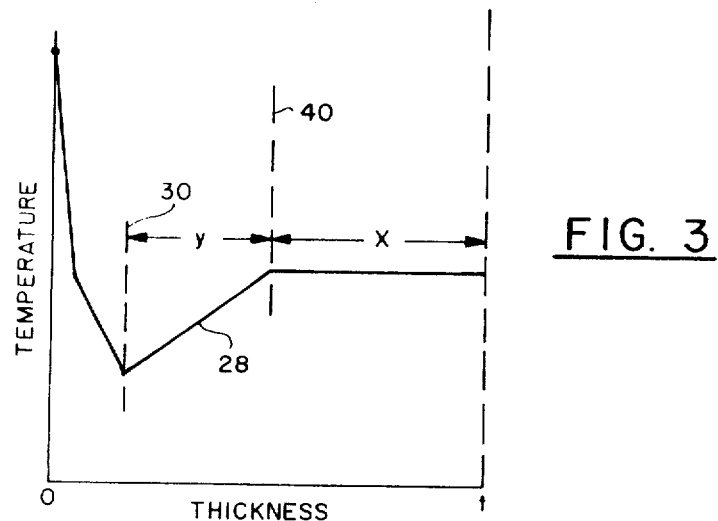
FIG. 3 is a diagrammatic representation illustrating the thermal distribution through the mirror of FIG. 1.

In accordance with the present invention, it has been found that thermal distortion of the mirror 2 occurs when the thermal moments about the neutral plane 40 are unbalanced. That is, when the product of the temperature of the mirror structure and its distance to the neutral plane between the reflective surface 14 and the neutral plane 40 is not equal to the product of the temperature of the mirror structure and its distance to the neutral plane on the opposite side of the neutral plane 40 to the back of the mirror. With the mirror structure of FIG. 1, the thermal moments about the neutral plane 40 may be balanced conveniently by increasing or decreasing the distance Y of FIG. 3 of the minimum temperature plane 30 to the neutral plane 40 during design. In an assembled mirror, this may be accomplished by "lapping" the rear surface of plate 12 to reduce its thickness, and hence, to reduce the thermal moment of the region "X," or by bonding sheets of additional material to the plate 12 to increase its thickness and, thus, increase the thermal moment of the region "X."

Obviously, the thermal moment of the region "X" could also be regulated by applying heat or coolant to the plate 12, as required. However, this technique is less accurate and less reliable than adjusting the structure of the plate 12 to balance the thermal moments. In addition, numerous other variations and modifications may be made without departing from the present invention. Accordingly, it should be clearly understood that the form of the present invention described above and shown in the accompanying drawing is illustrative only and is not intended to limit the scope of the present invention.

What is claimed is:

1. The method of minimizing thermal distortion of a mirror, said method comprising the steps of:
    establishing a minimum temperature plane extending parallel to the reflective surface of said mirror, and located between said reflective surface and the center of the mirror structure,
    determining the thermal distribution through said mirror to determine the location of the neutral plane of said mirror, and
    balancing the thermal moment between said reflective surface and the neutral plane with the thermal moment on the opposite side of said neutral plane.

2. The method of claim 1 wherein said balancing step comprises:
    adjusting the structure of said mirror on the surface opposite from said reflective surface.

3. The method of forming a thermally compensated mirror, said method comprising the steps of:
    constructing a laminated mirror structure having a front plate formed with a reflective front surface,
    a rear surface plate defining a coolant outlet,
    a plurality of intermediate plates defining coolant distribution passageways for circulating coolant fluid in heat exchanging relation and establishing a minimum temperature plane within said structure extending parallel to said surfaces, and
    coolant inlet means for delivering coolant fluid to said distribution passageways,
    determining the thermal distribution through said structure to determine the neutral plane of said structure,
    balancing the thermal moment between said reflective surface and the neutral plane with the thermal moment between said rear surface and the neutral plane.

4. The method of claim 3 wherein said balancing step comprises:
    adjusting the thickness of said rear surface plate.

References Cited
UNITED STATES PATENTS

| | | | |
|---|---|---|---|
| 3,637,296 | 11/1972 | McLafferty et al. | 350—310 |
| 3,645,608 | 2/1972 | Staley et al. | 350—310 |
| 3,731,992 | 5/1973 | Mansell | 350—310 |

EDWARD G. WHITBY, Primary Examiner

U.S. Cl. X.R.

117—35 R; 165—61; 350—288